United States Patent [19]

Kasai et al.

[11] 4,175,408
[45] Nov. 27, 1979

[54] APPARATUS FOR ABSORBING OIL PRESSURE IN AN IMPACT TYPE TOOL

[75] Inventors: Kaname Kasai; Takaji Mukumoto, both of Kawagoe; Toshikazu Asakura, Sayama; Ryoji Ueda, Iruma, all of Japan

[73] Assignee: Honda Giken Kogyo Kabushiki Kaisha, Tokyo, Japan

[21] Appl. No.: 857,666

[22] Filed: Dec. 5, 1977

[30] Foreign Application Priority Data

Dec. 10, 1976 [JP] Japan .................... 51-164722[U]

[51] Int. Cl.² .............................................. F16D 3/80
[52] U.S. Cl. .................................. 64/26; 173/93.5
[58] Field of Search ............ 64/26, 9 R; 184/102, 184/64; 173/93.5, 93.6

[56] References Cited

U.S. PATENT DOCUMENTS

| | | | |
|---|---|---|---|
| 3,116,617 | 1/1964 | Skoog | 64/26 |
| 3,210,963 | 10/1965 | Burnett | 64/26 |
| 3,214,940 | 11/1965 | Kramer | 64/26 |
| 3,214,941 | 11/1965 | Shulters | 64/26 |

FOREIGN PATENT DOCUMENTS 1023088  3/1966  United Kingdom ................ 64/26

Primary Examiner—Charles J. Myhre
Assistant Examiner—R. C. Turner
Attorney, Agent, or Firm—Haseltine, Lake & Waters

[57] ABSTRACT

An apparatus for absorbing oil pressure in an impact tool with an eccentric oil chamber in a rotatable cylinder connected to a drive with a rotor and spindle. Movement of the rotor relative to the oil chamber urges oil into chambers outside of the rotor. A space chamber formed inside of the cylinder communicating with the oil chamber is filled with a soft elastic member such as foam rubber.

4 Claims, 4 Drawing Figures

APPARATUS FOR ABSORBING OIL PRESSURE IN AN IMPACT TYPE TOOL

BACKGROUND OF THE INVENTION

This invention relates to an oil pressure absorbing apparatus in an impact type tool used chiefly for tightening by rotation of a screw member such as a bolt, a nut or the like.

Such types of tools have been hitherto known where an eccentric oil chamber formed in a rotatable cylinder connected to a driving source such as an air motor or the like, is provided with a rotor connected to a spindle, so that every time the rotor reaches a predetermined angular position during its relative rotation in relation to the oil chamber, oil is confined in respective partitioned chambers formed on both sides of the rotor and the rotor is thereby given an impact torque. In this case, due to temperature rise during use of the tool, the oil increases in temperature and expands. Thus, the output torque is liable to change or in addition oil leakage is apt to occur. In order to prevent those defects, it is necessary to provide an apparatus where oil pressure is absorbed on increasing of the same.

With this kind of apparatus it has been known to have a space chamber formed in the cylinder or the rotor with a piston contained therein. Such piston is urged in one direction by a spring, so that an oil pressure absorbing chamber is formed in front of the piston. However, this type of apparatus is troublesome to assemble and is high in price.

U.S. Pat. No. 3,116,617 discloses a prior art fluid impulse torque tool.

SUMMARY OF THE INVENTION

This invention has for its main object to provide an apparatus free from defects of the prior art.

Another object of the present invention is to automatically accumulate excessive oil in response to an increase in oil temperature during use of the tool.

Still another object of the invention is to provide an auxiliary chamber for accumulation of excessive oil during use of the tool.

The principal feature of the present invention is directed to an arrangement of the type that an eccentric oil chamber formed in a rotatable cylinder connected to drive source, such as an air motor or the like, is provided with a rotor connected to a spindle, so that every time the rotor reaches a predetermined angular position in the course of its relative rotation in relation to the oil chamber, the oil is confined in respective partitioned chambers 3a,3a formed on both sides of the rotor 5, the rotor 5 being subjected to an impact torque, and at least one longitudinally extending space chamber in communication with the oil chamber is formed in the cylinder or the rotor and is filled with a soft elastic member such as of a closed cell type foam rubber or the like. One side of the rotor has a blade urged outwardly by a spring.

Other objects and advantages of the present invention will be understood with respect to the accompanying specification, claims and drawings.

IN THE DRAWINGS

DESCRIPTION OF THE INVENTION

As shown in the figures, three space chambers 6 are formed in parallel one with another in a thicker wall portion of the cylinder 2. However, in the alternative, the same may be provided on the side of rotor 5.

Figure 1:
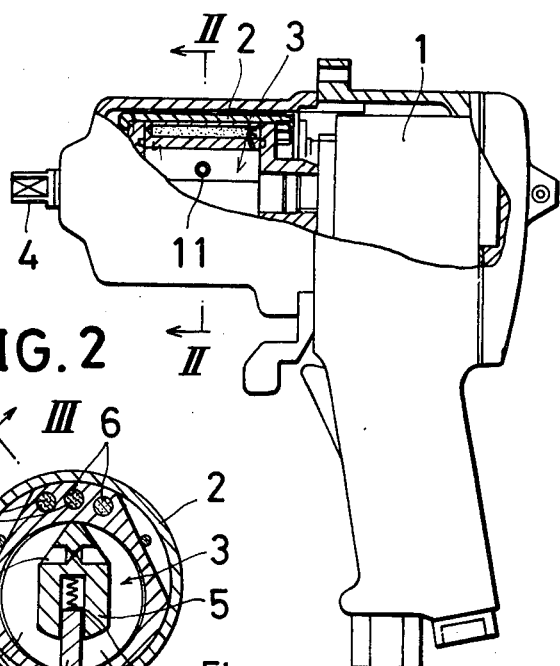
FIG. 1 is a side view, partly in section, of a tool illustrating an embodiment of the present invention.
Figure 2:
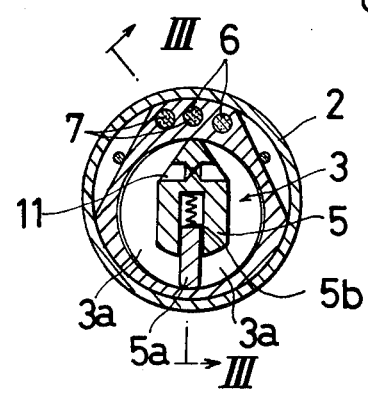
FIG. 2 is a sectional view taken along the line II—II in FIG. 1.
Figure 3:
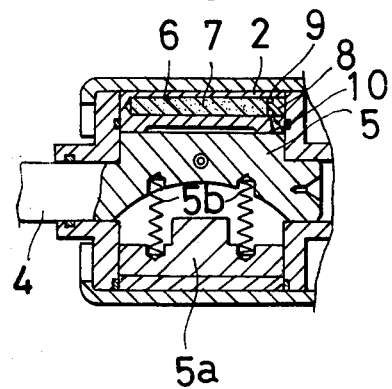
FIG. 3 is a sectional view taken along the line III—III in FIG. 2.
Figure 4:
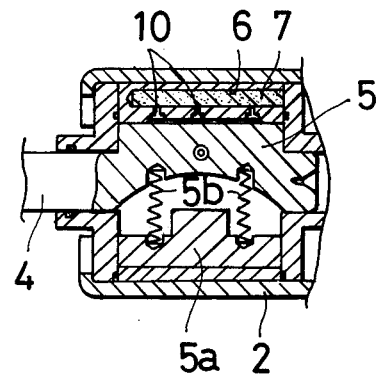
FIG. 4 is a sectional side view of part of an alternate embodiment of the invention.

The space chamber 6 is so arranged as in one example, shown clearly in FIG. 3, the same is filled with the soft elastic member 7 extending over almost the whole length thereof, so that a space gap 9 is at one end portion between the member 7. A closure member 8 applied to that end thereof, is in communication with the oil chamber 3 through an opening 10. Alternatively, the same may be so arranged, that, as shown clearly in FIG. 4, the space gap 9 is not left and the chamber 6 is in communication with the oil chamber 3 through plural openings 10 disposed at proper intervals along throughout the whole length thereof.

In the illustrated embodiments, the partitioned chambers 3a,3a formed on the opposite sides of the rotor 5 are in communication one with another through an orifice 11 made in the rotor 5 so that an output torque may be set in valve by the orifice 11. A modification of the orifice 11 can be formed so that it is formed as to be variably opened and thus the output torque can thereby be adjusted to any desired value.

Operation of the apparatus takes place as follows:

When, temperature rises during use of the tool, the oil temperature in the oil chamber 3 increases and the oil consequently expands, the excessive oil resulting from such expansion flows into the space chamber 6 through the opening 10, and accumulates in the space portion provided by deformation through compression of the soft elastic member 7. If, thereafter, the temperature lowers, the excessive oil is returned from the space chamber 6 into the oil chamber 3 by a restoring elastic force of the member 7.

Thus, according to the invention, the space chamber 6 of long opening which is in communication with the oil chamber 3 is formed in the cylinder 2 or the rotor 5 and the same is charged with the soft elastic member 7. In response to the expansion of the oil in the oil chamber 3, and as temperature of the oil rises, excessive oil resulting therefrom, is automatically accumulated in the space chamber 6 while compressing the member 7. Thereafter, if the temperature is lowered, the excessive oil is returned to the oil chamber by the elastic force of the member 7, and thus change in the output torque or oil leakage can be prevented. The construction of the apparatus may be simple, since only member 7 is required to be charged.

Many modifications and variations of the present invention are possible in light of the above teachings. It is, therefore, to be understood that within the scope of the appended claims, the invention may be practiced otherwise than as particularly described.

What we claim is:

1. An apparatus for absorbing oil pressure in an impact tool employing an eccentric oil chamber, said chamber being formed in a rotatable cylinder connected to an air motor drive having a rotor connected to a spindle, wherein: said rotor by moving relative to said oil chamber in predetermined angular position thereby urges oil into respective partitioned chambers formed outside of the rotor to impart an impact torque to said rotor; and at least one longitudinally extending space chamber formed in the cylinder is in communication with the oil chamber being filled with a closed cell type foam rubber.

2. An apparatus as claimed in claim 1, wherein: the space chamber is filled with the soft elastic member extending substantially over the whole length thereof, and a space gap at left at one end portion thereof, is in communication with the oil chamber through an opening.

3. An apparatus as claimed in claim 1, wherein: the space chamber is filled with the soft elastic member throughout the whole length thereof, and being in communication with the oil chamber through a plurality of openings disposed at proper intervals along throughout the whole length thereof.

4. An apparatus as claimed in claim 1 wherein: said extending space chamber is formed in the rotor.

* * * * *